US012724956B2

(12) United States Patent
Tseng et al.

(10) Patent No.: US 12,724,956 B2
(45) Date of Patent: Sep. 1, 2026

(54) DETERMINING ATTRIBUTES FOR ELEMENTS OF DISPLAYABLE CONTENT AND ADDING THEM TO AN ACCESSIBILITY TREE

(71) Applicant: GOOGLE LLC, Mountain View, CA (US)

(72) Inventors: David Tseng, Sunnyvale, CA (US); Ramin Halavati, Munich (DE); Nektarios Paisios, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 803 days.

(21) Appl. No.: 18/046,898

(22) Filed: Oct. 14, 2022

(65) Prior Publication Data

US 2024/0126978 A1 Apr. 18, 2024

(51) Int. Cl.

| | |
|---|---|
| ***G06F 40/14*** | (2020.01) |
| ***G06F 40/106*** | (2020.01) |
| ***G06V 30/10*** | (2022.01) |
| ***G06V 30/414*** | (2022.01) |

(52) U.S. Cl.

CPC ............ *G06F 40/14* (2020.01); *G06F 40/106* (2020.01); *G06V 30/10* (2022.01); *G06V 30/414* (2022.01)

(58) Field of Classification Search

None

See application file for complete search history.

(56) References Cited

U.S. PATENT DOCUMENTS

| | | | | |
|---|---|---|---|---|
| 8,086,957 | B2 * | 12/2011 | Bauchot | G06Q 30/02 715/239 |
| 9,268,753 | B2 * | 2/2016 | Hendry | G06F 40/143 |
| 9,465,887 | B2 * | 10/2016 | Zhang | G06Q 30/0277 |
| 9,582,600 | B1 * | 2/2017 | Killian | G06F 40/143 |
| 9,904,936 | B2 * | 2/2018 | Neelakant | G06F 16/951 |
| 11,017,220 | B2 * | 5/2021 | Huang | G06F 18/24 |
| 11,194,884 | B2 * | 12/2021 | Brunet | G06F 40/14 |
| 11,922,712 | B2 * | 3/2024 | Tsibulevskiy | G06F 18/40 |
| 2004/0194035 | A1 * | 9/2004 | Chakraborty | G06F 40/134 715/228 |

(Continued)

FOREIGN PATENT DOCUMENTS

| | | | |
|---|---|---|---|
| JP | 2006309443 | A | 11/2006 |
| JP | 2008176764 | A | 7/2008 |

(Continued)

OTHER PUBLICATIONS

"Accessible Rich Internet Applications", W3C (WAI-ARIA) 1.1; https://www.w3.org/TR/wai-aria-1.1/, Dec. 14, 2017, 241 pages.

(Continued)

*Primary Examiner* — Maikhanh Nguyen

(74) *Attorney, Agent, or Firm* — Brake Hughes Bellermann LLP

(57) ABSTRACT

A method may receive an image representing displayable content for display by an application. A method may execute a layout extraction model using the image as input and generating a list of elements for the image as output, the list of elements including at least a bounding box defining a portion of the image and a role attribute. A method may add the role attribute to a node in an accessibility tree using the list of elements.

16 Claims, 11 Drawing Sheets

(56) References Cited

U.S. PATENT DOCUMENTS

| | | | | |
|---|---|---|---|---|
| 2004/0268249 | A1* | 12/2004 | Fennelly | G06F 16/258<br>715/236 |
| 2005/0022116 | A1* | 1/2005 | Bowman | G06F 16/986<br>707/E17.118 |
| 2009/0292984 | A1* | 11/2009 | Bauchot | G06Q 30/02<br>345/581 |
| 2013/0191732 | A1 | 7/2013 | Lazarevic et al. | |
| 2015/0058711 | A1* | 2/2015 | Zeng | G06F 3/04886<br>715/234 |
| 2018/0204111 | A1* | 7/2018 | Zadeh | G06N 3/088 |
| 2019/0179879 | A1* | 6/2019 | Amiga | G06F 21/554 |
| 2021/0109717 | A1 | 4/2021 | Voicu et al. | |
| 2022/0129688 | A1* | 4/2022 | Yu | G06Q 10/0838 |
| 2022/0319219 | A1* | 10/2022 | Tsibulevskiy | G06F 18/40 |

FOREIGN PATENT DOCUMENTS

| | | | |
|---|---|---|---|
| WO | 2020101479 | A1 | 5/2020 |
| WO | 2021076205 | A1 | 4/2021 |

OTHER PUBLICATIONS

Faulkner, "Making the Gui Talk (1991) by Rich Schwerdtfeger", TPGi, LLC; https://www.tpgi.com/making-the-gui-talk-1991-by-rich-schwerdtfeger/, Jan. 20, 2015, 13 pages.

Myers, "The Accessibility Tee", https://benmyers.dev/blog/accessibility-tree/, Nov. 12, 2019, 9 pages.

International Search Report and Written Opinion for PCT Application No. PCT/US2023/076757, mailed on Jan. 9, 2024, 12 pages.

* cited by examiner

DETERMINING ATTRIBUTES FOR ELEMENTS OF DISPLAYABLE CONTENT AND ADDING THEM TO AN ACCESSIBILITY TREE

TECHNICAL FIELD

This description relates to methods to add attributes or nodes to an accessibility tree to make additional displayable content accessible.

BACKGROUND

This description generally relates to methods to generate roles and/or nodes for elements of displayable content and add those roles and/or nodes to an accessibility tree. Accessibility trees are used to support accessible features in software, such as screen readers, which provide access to content for people with different sets of abilities. Traditionally, many documents, such as web documents, are heavily oriented towards providing content visually to users. Accessibility software such as screen readers, for example, may be used by people without vision, or with low vision, to provide content in alternative formats. Accessibility software relies on an accessibility tree being complete to facilitate providing content in accessible formats.

SUMMARY

The present disclosure describes ways to add information into an accessibility tree representing elements from displayable content that was previously absent from the accessibility tree. The disclosure describes an accessibility infrastructure that receives an image representing displayable content for display by an application. A layout extraction model generates a list of elements for the image. Each element includes a bounding box defining a portion of the image where the element is positioned, and a role attribute associated with the element. The accessibility infrastructure then adds the role attribute to a node in an accessibility tree. In some examples, the accessibility infrastructure may also add nodes or other attributes to the accessibility tree as well.

In some aspects, the techniques described herein relate to a method including: receiving an image representing displayable content for display by an application; executing a layout extraction model using the image as input and generating a list of elements for the image as output, the list of elements including at least a bounding box defining a portion of the image and a role attribute; and adding the role attribute to a node in an accessibility tree using the list of elements.

In some aspects, the techniques described herein relate to a system including: an image receiving module configured to receive an image representing displayable content for display by an application; a layout extraction model configured to use the image as input and generate a list of elements for the image as output, the list of elements including at least a bounding box defining a portion of the image and a role attribute; and an accessibility tree augmentation module configured to add the role attribute to a node in an accessibility tree using the list of elements.

In some aspects, the techniques described herein relate to a computing device including: a processor; and a memory configured with instructions to: receive an image representing displayable content for display by an application, execute a layout extraction model using the image as input and generate a list of elements for the image as output, the list of elements including at least a bounding box defining a portion of the image and a role attribute, and add the role attribute to a node in an accessibility tree using the list of elements.

DETAILED DESCRIPTION

The present disclosure describes ways to add information into an accessibility tree representing elements from displayable content that was previously absent from the accessibility tree. Accessibility trees are used by accessibility software to provide access to displayable content. When an accessibility tree associated with displayable content is not complete, accessibility software cannot provide full access to the displayable content. For example, image elements in web displayable content may not include information about their semantic function or content that can be ported into an accessibility tree. In another example, a PDF file may not include text that can be ported into the accessibility tree. In both circumstances, accessibility software will not be able to provide access to these image elements/documents.

The disclosure describes an accessibility infrastructure that receives an image representing displayable content for display by an application. A layout extraction model generates a list of elements for the image. Each element includes a bounding box defining a portion of the image where the element is positioned, and a role attribute associated with the element. The accessibility infrastructure then adds the role attribute to a node in an accessibility tree. In some examples, the accessibility infrastructure may also add nodes or other attributes to the accessibility tree as well.

Many documents and types of displayable content are designed to be presented via software to users in a visual way in the first instance. The visual clues in many documents help users navigate the content. For example, a subheading, a change in formatting of text, a table, or a button, all hold semantic meaning that help users navigate information. When this information is missing from accessibility tree, the displayable content becomes very difficult to navigate.

Content creators can sometimes take extra steps to create displayable content or documents that include the necessary information needed to generate a complete accessibility tree.

For example, in HTML a creator may include HTML attributes that are well understood by the accessibility tree generation function in a browser. Alternatively, a creator may include Accessible Rich Internet Applications (ARIA) tags in the HTML to specify an accessibility tree node or role. Many creators are not aware that they need to sometimes take extra steps to be sure that their content includes the necessary information to generate a complete accessibility tree, however. Unfortunately, this has meant that some displayable content and documents are not accessible to users via accessibility software.

Figure 1A:
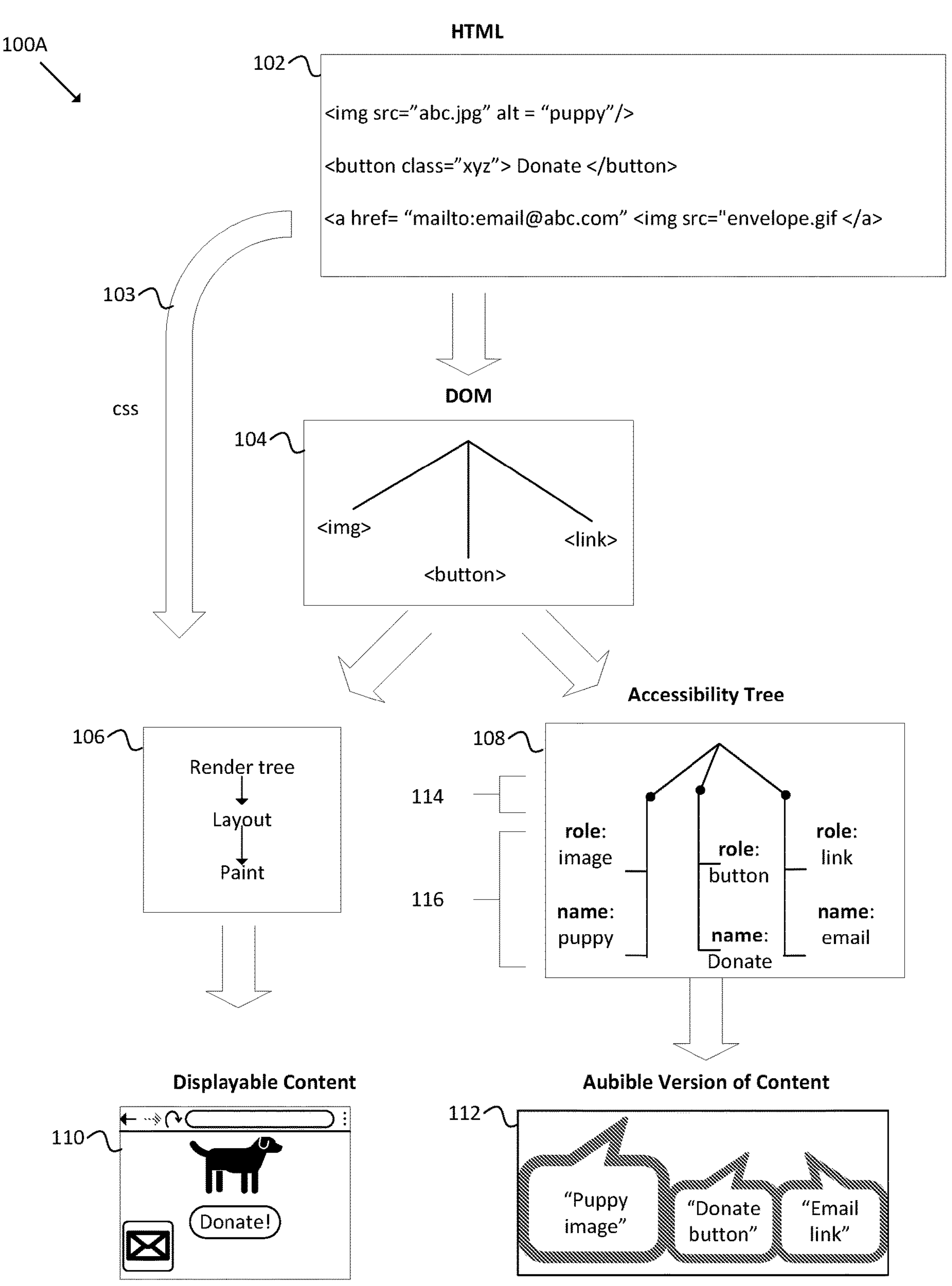
FIG. 1A depicts a document accessibility scenario 100A.

FIG. 1A depicts a document accessibility scenario 100A. Example document accessibility scenario 100A depicts two branches: a first branch provides displayable content 110 for visual display and a second branch provides an accessible version of displayable content 110 via accessibility software 112.

Document accessibility scenario 100A starts with HTML code 102 which includes displayable content. In examples, HTML code 102 may execute on any web browser. Example HTML code 102 generates a puppy image with a title, a button with the word, "Donate!", and an image of a letter icon that is a link to an email address. HTML code 102 is not intended to be limiting, however. In examples, HTML code 102 may display any possible content. Instead of HTML code 102. Document accessibility scenario 100A may receive displayable content and any other format designed for display in application executing on a user device.

A browser may use HTML code 102 to generate a document object model, DOM 104. DOM 104 is a data structure that represents the content dictated by the HTML code 102. In document accessibility scenario 100A, DOM 104 includes a node for an image, a button, and a link.

When presenting information visually, a browser may generate cascading style sheets, CSS 103 from HTML code 102. CSS 103 may be used to generate a CCS object model that provides information about the layout for the displayed content (not pictured).

Visual content processing module 106 may receive DOM 104 and CSS 103 as inputs and generate a render tree. Next layout software may compute the exact position and size of each object on the render tree. Finally, paint software may take the final render tree and generate pixels to display the content visually. In the example of FIG. 1A, the visible version of displayable content 110 is displayed including an image of a dog, a button with text that says, "Donate!", and an icon representing a letter that links to an email address.

Accessibility software may alternatively provide an accessible version of the content via the second branch of document accessibility scenario 100A. The application providing access to content (in the example of document accessibility scenario 100A a browser) may make API calls to an accessibility infrastructure to provide an accessible version of the displayable content.

The application providing access to content may use DOM 104 to generate accessibility tree 108. Accessibility tree 108 is a data structure that maps out content that can be navigated by accessibility software. Accessibility tree 108 includes node 114. In examples, 114 may include more than one node. In the example of document accessibility scenario 100A, accessibility tree 108 includes three nodes that all share a single parent node, which is the root node. This is not intended to be limiting, however. In examples, an accessibility tree may comprise any quantity of node 114 connected via any possible configuration of parent and child nodes. In examples, the root node may comprise a document node.

Each node 114 of accessibility tree 108 includes an attribute 116. In examples, attribute 116 may comprise any number of attributes 116. For example, each node 114 of example accessibility tree 108 depicted in FIG. 1A includes two attributes, a role and a name. This is not intended to be limiting, however. In examples, each node 114 may include any quantity of attribute 116. In examples, each node 114 may comprise a role attribute, a name attribute, a state attribute, and a description attribute. In examples, node 114 of accessibility tree 108 may include further attributes such as parent node id attribute, child node id attribute, location attribute. Node 114 may also include other metadata comprising details about the text, location, how the various nodes are represented, or any other feature.

The role attribute may describe a semantic role, for example, such as a heading, a button, a table, a paragraph, a text box, a combo box, a list box, an image, and so forth. In examples, the role attribute may comprise a role defined by any accessibility tree standard or definition, for example those defined by the ARIA standard. In further examples, the role attribute may include any classification for a group of elements in a display with any semantic meaning.

In examples, the name attribute may be related to the content represented by the node. For example, the name may represent the text on a button, or a clue about what is depicted in an image. In examples where the role attribute for a node relates to text, the name field may comprise the text.

Accessibility software 112 uses accessibility tree 108 to generate an accessible version of the displayable content. In the example of document accessibility scenario 100A, accessibility software 112 generates an audible version of the content, which includes reading the name attribute followed by the role attribute for each node: "Puppy image", "Donate button", and "Email link." The example of FIG. 1A is not intended to be limiting, however. In examples, other types of accessibility software may be used. In the case of a screen reader-type accessibility software 112, the screen reader may use additional attribute connected to each node 114 to provide additional audible clues.

While document accessibility scenario 100A provides the example of turning displayable content in the form of HTML code into visible and accessible content, this is not intended to be limiting. In examples, document accessibility scenario 100A may transform any other format of displayable content to visible and/accessible content.

The challenge for accessibility in generating displayable content for display on a web browser is that it requires developers to use HTML tags and ARIA attributes in a way that matches their code's intent. Lack of awareness and prioritization among developers, and a failure to prioritize accessibility is the main barrier to an accessible web and accessible content. Prior assistive technologies often miss layout elements, such as custom controls (e.g., a <div> tag with a custom class used as a button) and common icon controls (e.g., the browser back button). Prior assistive technologies also do not generate an accessibility tree for image-based documents like PDFs.

Figure 1B:
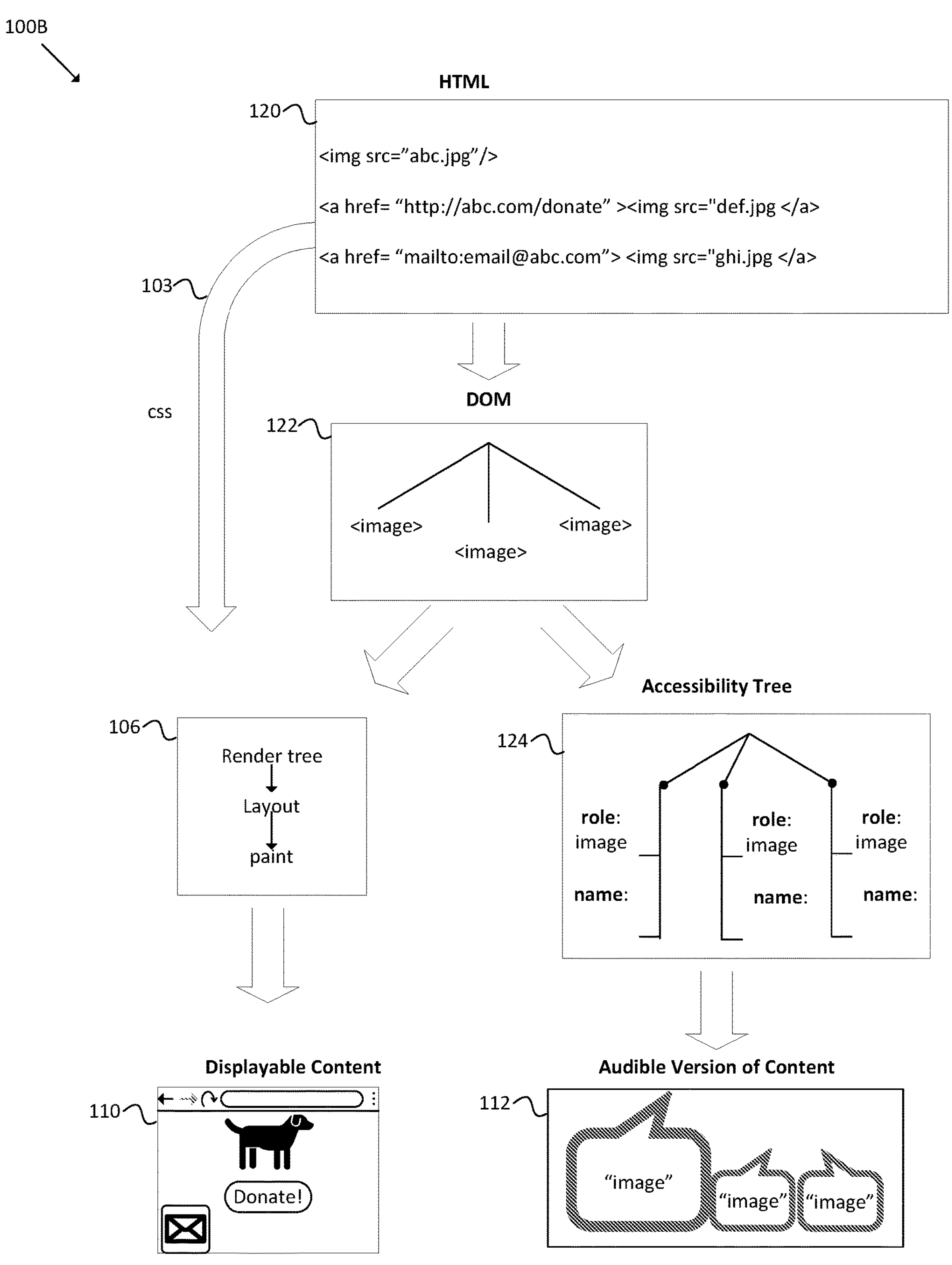
FIG. 1B depicts a document accessibility scenario 100B.

This problem is illustrated in FIG. 1B with document accessibility scenario 100B. Document accessibility scenario 100B uses a different HTML code 120 to generate substantially the same displayable content 110. HTML code 120 is an example of HTML code where the content creator has not included HTML tags or ARIA attributes to facilitate the creation of a complete accessibility tree. For example, HTML code 120 provides an image "abc.jpg", without a name that provides a clue as to what the content of the image file is. HTML code 120 further provides a button link that is an image of a button "def.gif" instead of an HTML button tag. Finally, HTML code 120 provides an image that is a link to an email address, "ghi.jpg", without a link HTML tag.

As a result, DOM 122, which is generated from HTML code 120, looks very different from DOM 104. Whereas DOM 104 included image, button, and link nodes, DOM 122 includes three image nodes. When DOM 122 is transformed into accessibility tree 124, each of the three example elements of HTML code 120 has a role attribute of image and the name of a respective image file, which in this case was arbitrarily assigned. As a result, when accessibility software 112 generates an audible version of HTML code 120, accessibility software 112 will read, "image", "image", and "image". The accessible version of HTML code 120 therefore does not include all of the information available in displayable content 110. As such, document accessibility scenario 100A does not provide adequate accessibility to displayable content 110.

Figure 1C:
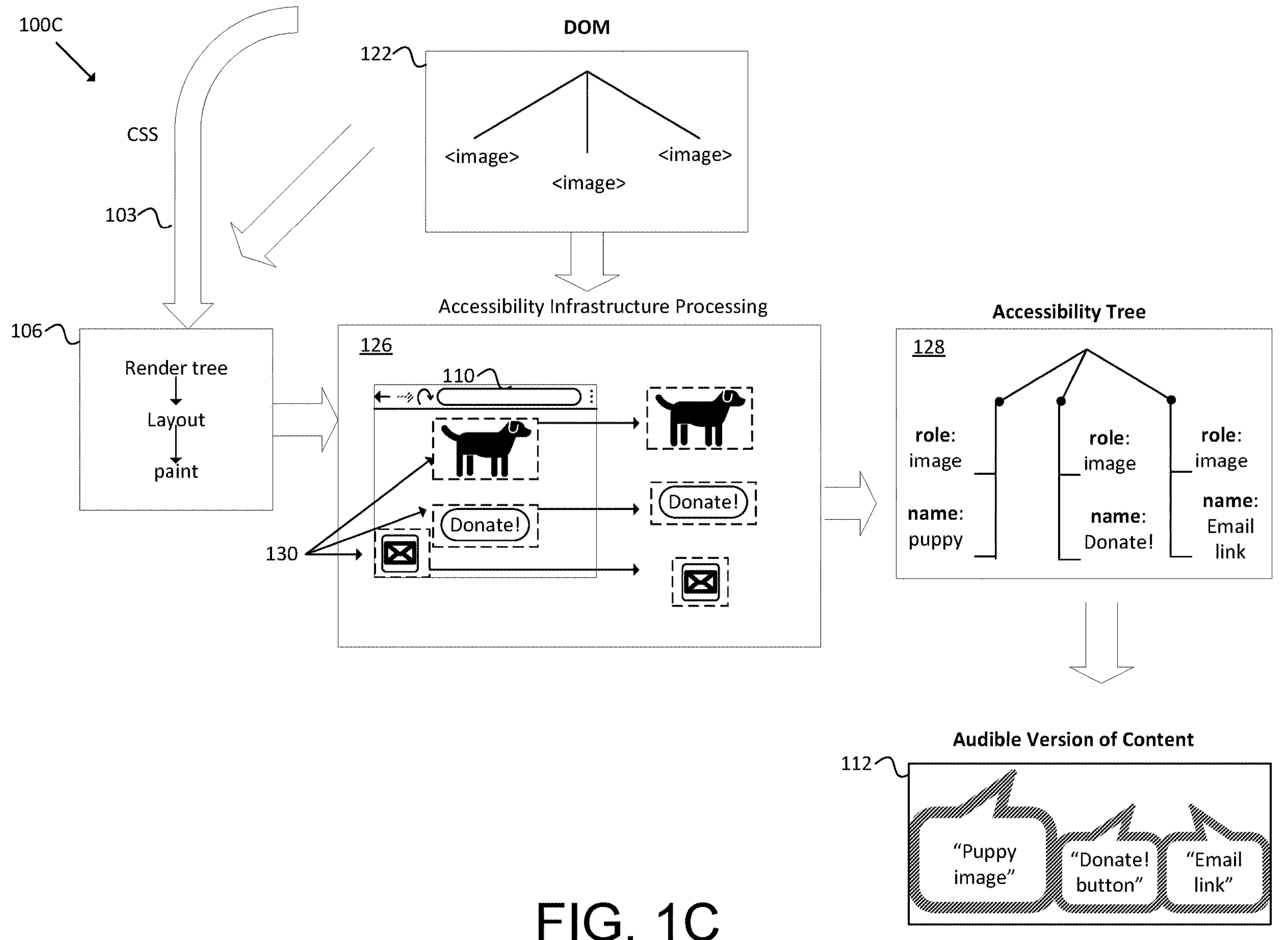
FIG. 1C depicts an image to document accessibility scenario 100C, according to examples described throughout this disclosure.

Document accessibility scenario 100C depicted in FIG. 1C also provides access to HTML code 120 from document accessibility scenario 100B. However, in document accessibility scenario 100C the access to HTML code 120 is significantly improved by the inclusion of an accessibility infrastructure 126. Accessibility infrastructure 126 receives an image, generates bounding boxes around portions of the image comprising an individual element, and identifies a role attribute for that individual component. This is depicted visually in FIG. 1C. In the example of FIG. 1C, displayable content 110 comprising a webpage display is output from visual content processing module 106 and received at accessibility infrastructure 126. Displayable content 110 comprises the same three elements depicted in FIGS. 1A and 1B: a dog image, a donate button, and in letter icon denoting an email link. Accessibility infrastructure 126 generates at least one bounding box 130 within the image comprising displayable content 110. In the example of document accessibility scenario 100C, accessibility infrastructure 126 identifies three instances of bounding box 130, represented with dotted lines, one bounding box 130 for each of three respective elements. Accessibility infrastructure 126 then determines a role attribute for each respective element defined by the bounding box. Finally, accessibility infrastructure 126 adds a role attribute to a node 114 in an accessibility tree 128. This is not intended to be limiting, however. In examples, adding the role attribute to node 114 may comprise amending the role attribute. For example, the role attribute of "image" may be amended to "button".

The resulting accessibility tree 128 may include more detail and/or accuracy than accessibility tree 124 depicted in FIG. 1B, thereby making the displayable content accessible to accessibility software 112. Accessibility software 112, which may be a screen reader, receives accessibility tree 128, and can recite that the image comprises a "Puppy image", a "Donate! button", and an "Email link". Accessibility infrastructure 126 is described in further detail below.

Figure 2:
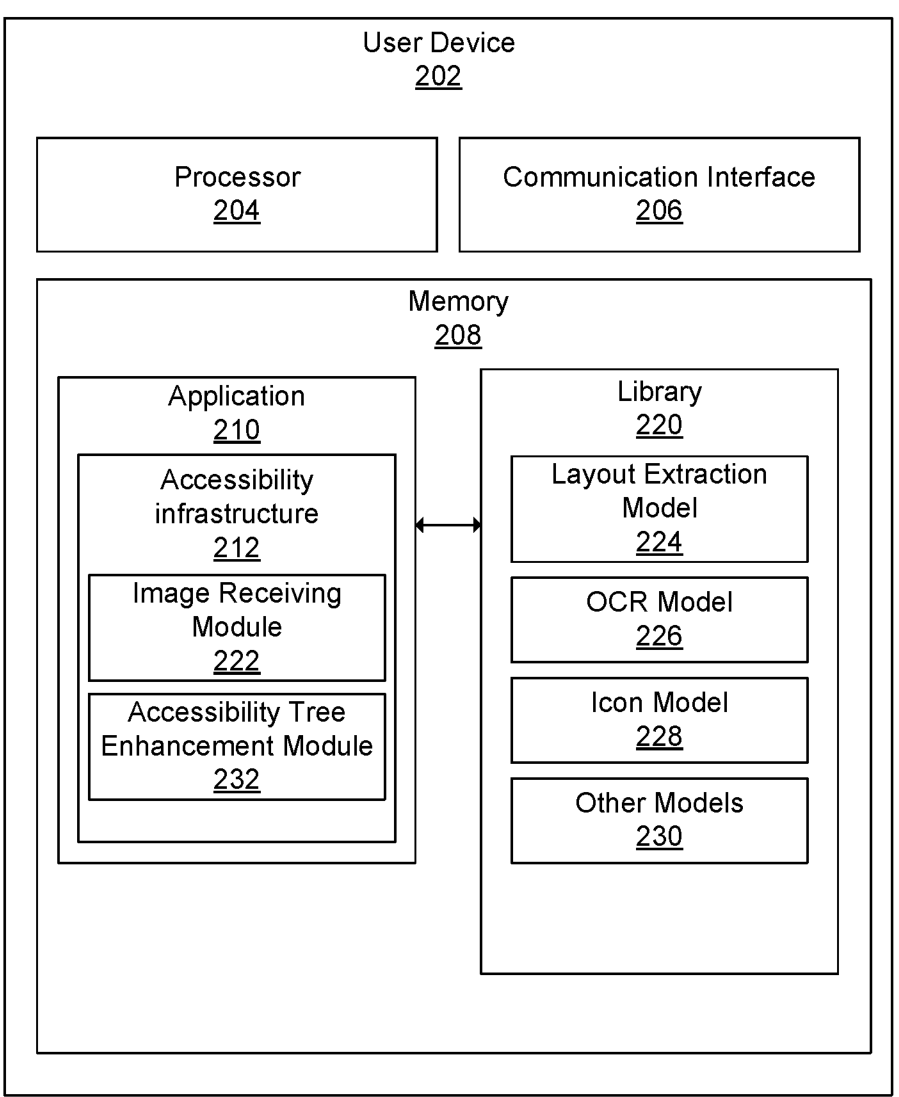
FIG. 2 depicts a user device 202, according to examples described throughout this disclosure.

FIG. 2 depicts a user device 202 operable to execute the methods described in the Application. In examples, user device 202 may comprise a laptop computer, desktop computer, handheld device such as a tablet, a mobile phone, a wrist-mounted device such as a smartwatch, or any other user device that provides access to content including images.

User device 202 includes a processor 204, communication interface 206, and memory 208. In examples, processor 204 may include multiple processors, and memory 208 may include multiple memories. Processor 204 may be configured by instructions to execute the accessibility infrastructure described in the disclosure. The instructions may include non-transitory computer readable instructions stored in, and recalled from, memory 208.

Communications interface 206 of user device 202 may be operable to facilitate communication between user device 202 and a server or another computing device. In examples, communications interface 206 may utilize short-range wireless communication protocols, such as BLUETOOTH, Wi-Fi, Zigbee™, or any other wireless or wired communication methods.

Memory 208 includes application 210. In examples, the application may comprise a web browser such as Google Chrome, Firefox, Microsoft Edge, or any other web browser. In examples, the application may comprise any application operable to display a document for user such as a PDF viewer, a word processor, etc. In examples, the application may comprise any application operable to provide user access to a document or displayable content.

Application 210 includes accessibility infrastructure 212. Accessibility infrastructure 212 is operable to receive an image, identify an element in the image via a bounding box, generate a role attribute for the element, and update a role attribute for a node in an accessibility tree.

In examples, accessibility infrastructure 212 may execute one or more software modules. In examples, accessibility infrastructure 212 may execute any combination of image receiving module 222, layout extraction model 224, OCR model 226, icon model 228, other models 230, and/or accessibility tree enhancement module 232. In the example of FIG. 2, image receiving module 222, layout extraction model 224, OCR model 226, icon model 228, other models 230, and accessibility tree enhancement module 232 are included in a library 220 separate from application 210. In examples, library 220 may comprise a separate software executable available to accessibility infrastructure 212 via, for example, one or more API calls. The example of FIG. 2 is not intended to be limiting, however. In examples, any of image receiving module 222, layout extraction model 224, OCR model 226, icon model 228, other models 230, and accessibility tree enhancement module 232 may be incorporated into the object code or the executable code of accessibility infrastructure 212 or library 220.

Figure 3:
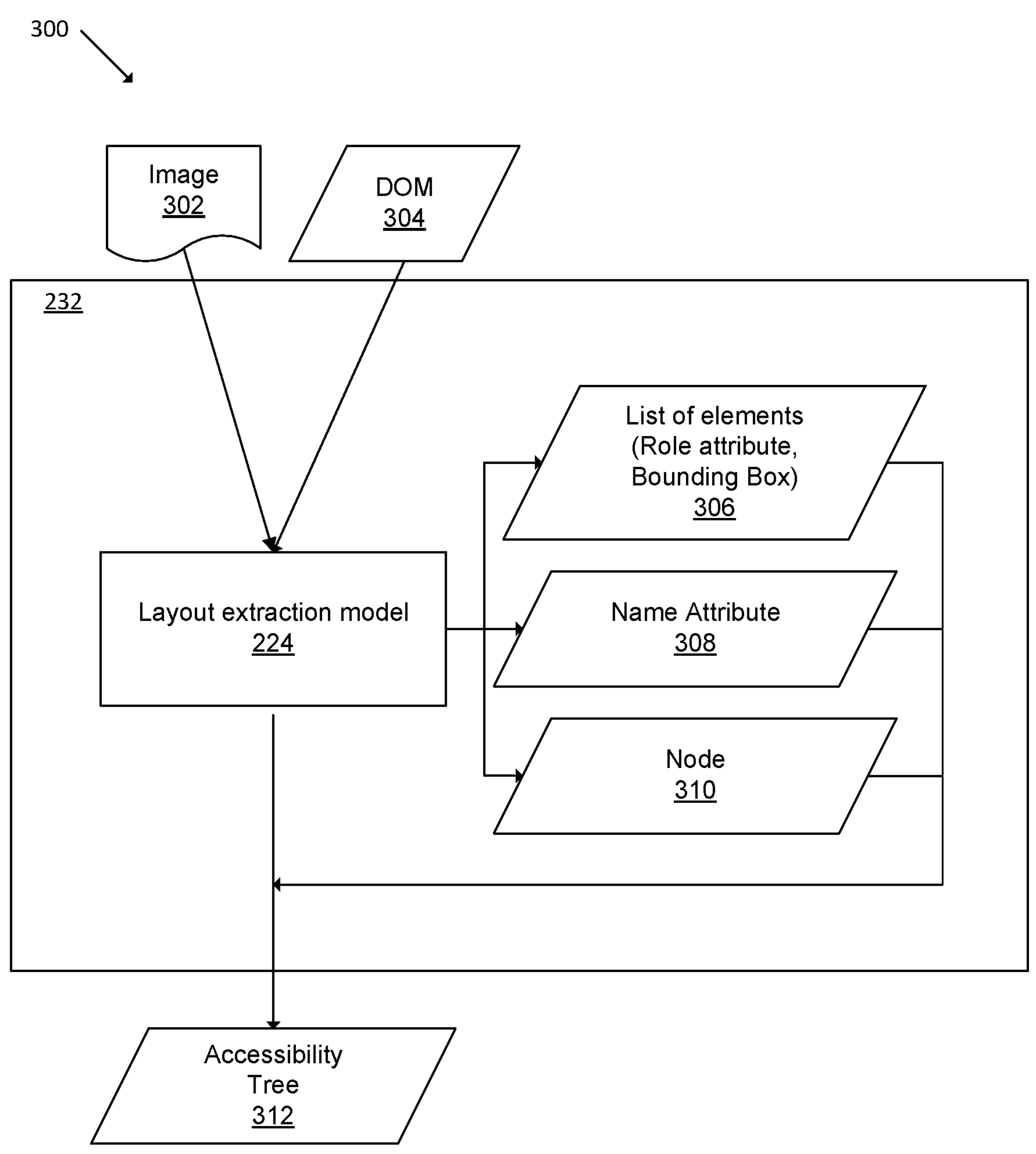
FIG. 3 depicts a flowchart 300, according to examples described throughout this disclosure.

In examples, any of image receiving module 222, layout extraction model 224, OCR model 226, icon model 228, other models 230, and accessibility tree enhancement module 232 may execute on a server (not depicted) available to accessibility infrastructure 212 via a network and communication interface 206. In the instance where any of image receiving module 222, layout extraction model 224, OCR model 226, icon model 228, other models 230, and accessibility tree enhancement module 232 may execute on a server, the user is provided with controls allowing the user to make an election as to what image data other displayable content data may be sent to the server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined from the image data or displayable content data submitted to a server. Thus, the user may have control over what information is collected about the user, how that information is used, and what information is provided to the user FIG. 3 depicts flowchart 300. Flowchart 300 depicts the execution of accessibility infrastructure 126. Flowchart 300 begins when application 210 sends an image 302 to the accessibility infrastructure 126. In examples, image 302 may be received in response to determining that an accessibility tree for displayable content 110 has node 114 with an image or document role. In examples, image 302 may be received in response to determining that node 114 is missing an attribute 116 or has a null value for an attribute 116. For example, as described above with respect to example accessibility tree 124, each of the three nodes includes an image with no name attribute. In examples where a single document is received for display, for example a PDF document, the accessibility tree may comprise only a root node representing the document with no attributes. In examples, image 302 may be received in response to a user command. For example, a user navigating displayable content 110 within application 210 using a screen reader may suspect that their screen reader is missing information and initialize the steps of flowchart 300 via user command.

Flowchart 300 depicts that layout extraction model 224 receives an image 302. For example, layout extraction model 224 may receive image 302 via image receiving module 222. Image receiving module 222 is operable to receive an image from application 210.

Image 302 may represent displayable content 110 for display by application 210. In examples, image 302 may comprise any type of image file, including but not limited to a PDF, JPEG, JPG, GIF, TIF, BMP, or any other image format that goes through a process of at least one of rendering, layout, or painting for display on a computer display via visual content processing module 106. In examples, displayable content 110 may comprise any combination of HTML elements designed for display in an application. For example, displayable content may comprise a custom control (e.g., a <div> tag with a custom class used as a button) and common icon controls (e.g., the browser back button). The custom controls may comprise an image, a button, a text box, table, a radio button, heading, paragraph, a link, etc. The examples provided are not intended to be limiting. In examples, the image may comprise any type of displayable content.

Layout extraction model 224 is operable to use image 302 as input and generate a list of elements 306 for image 302 as output. List of elements 306 includes at least a bounding box 130 defining a portion of the image 302 and a role attribute associated with the bounding box 130.

Layout extraction model 224 may comprise a machine learned model trained, e.g., using supervised or semi-supervised training, to take image 302 and identify a list of elements from image 302, each element comprising bounding box 130 and the associated role attribute.

In examples, layout extraction model 224 may further receive a DOM 304 and executing the layout extraction model may further comprise using the document object model as input. In examples, DOM 304 may be generated by application 210. In examples, DOM 304 may be used by layout extraction model 224 to generate list of elements 306.

In examples, it may be determined that the role attribute relates to text. An attribute relating to text may comprise a heading, a paragraph, a word, a combo box, list box, text box, static text, or any other text-related displayable content that primarily comprises text with formatting.

In response to determining that the portion of image 302 comprises a role attribute that relates to text, layout extraction model 224 may execute OCR model 226 on the portion of image 302 and analyze an output of OCR model 226 to generate a text span. The text span may comprise a text string of characters.

In examples, OCR model 226 may comprise a machine learned model trained, e.g., using supervised or semi-supervised training, to receive the portion of image 302 and identify text within the portion of image 302.

In examples, OCR model 226 may output an OCR text tree. The OCR text tree may comprise a root node representing the image document. Child nodes of the root node may comprise paragraph nodes. Child nodes of the paragraph nodes may comprise sentence nodes. Child nodes of the sentence nodes may comprise word nodes. Child nodes of the word nodes may comprise character nodes. Metadata may be further included with the nodes of the OCR text tree, including information about text location and text formatting.

The OCR text tree is not in a format that can be stitched into accessibility tree 312. Therefore, in examples layout extraction model 224 may perform further processing on OCR text tree to generate the text span. In examples analyzing the OCR text tree output by OCR model 226 to generate a text span may further include determining a formatting applied to a consecutive group of characters in the output of the OCR model. The text span may then be set to a consecutive group of characters with the same formatting.

Figure 1D:
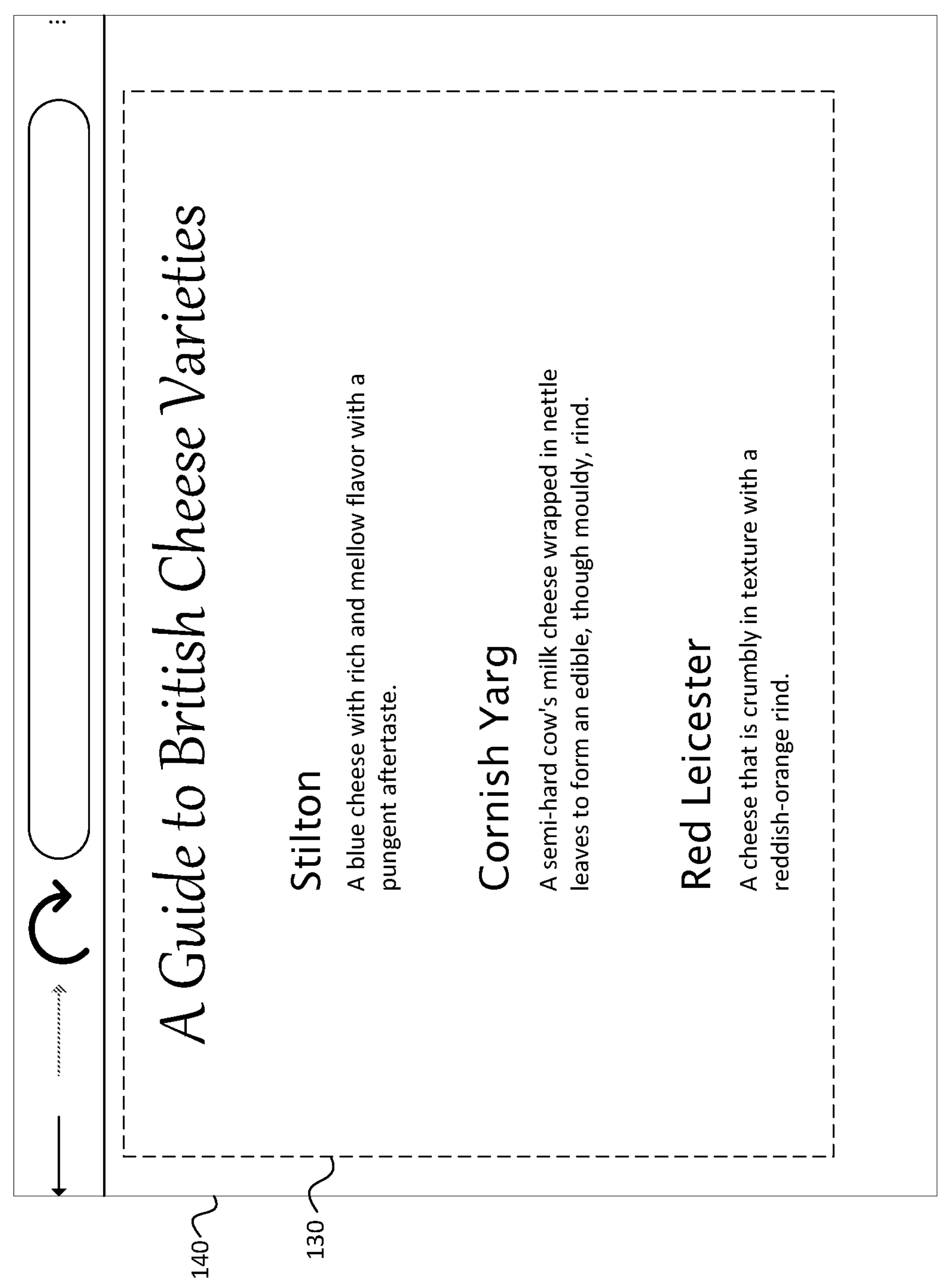
FIG. 1D depicts displayable content comprising text, according to examples described in this disclosure.

For example, FIG. 1D depicts example displayable content 140. Displayable content 140 may comprise a PDF file displayed on a web browser. Displayable content 140 includes a title, three headings, and a respective paragraph under each of the three headings. Layout extraction model 224 has drawn bounding box 130 around the entire area of displayable content 140 that includes text, thereby capturing substantially all of displayable content 140. In examples, layout extraction model 224 may instead draw bounding boxes around each of or any adjacent combination of the title, three headings, and three paragraphs, however.

In examples, OCR model 226 may seek to identify text within bounding box 130 by looking for text starting in the upper left corner and sweeping right along a row-like surface area, repeating this action for sequential lower rows until OCR model 226 reaches the bottom of bounding box 130. In this way, OCR model 226 may emulate reading the English language. This is not intended to be limiting, however. For other languages, OCR model 226 may evaluate the area of bounding box 130 in different orders, for example from right to left for the Hebrew language. In examples, OCR model 226 may evaluate the area represented by bounding box 130 for text using any other method.

The OCR text tree output by OCR model 226 for displayable content 140 may include the text represented in displayable content 140, along with metadata identifying the formatting of the text. Formatting may include, for example, font size, font type, font color, font styles such as bold, italic, underline, strikeout, subscript, and superscript. By traversing the OCR text tree, layout extraction model 224 may therefore evaluate all the text found in bounding box 130 starting in the upper left-hand corner sweeping right, in subsequent rows to the bottom of bounding box 130.

In examples, layout extraction model 224 may determine a formatting applied to a consecutive group of characters when traversing the OCR text tree. For example, the title of displayable content 140, "A Guide to British Cheese Varieties" includes a consecutive group of characters that all have the same formatting. Subsequent rows of text in displayable content 140 have different formatting. Therefore, the characters of the title may be grouped together into a single text span by layout extraction model 224 for inclusion in accessibility tree 312 separate from the other text found in displayable content 140.

In examples, layout extraction model 224 may set a name attribute to the text span. In examples, accessibility infrastructure 212 may access the name attribute to share the content of the text span with a user. In other examples, however, layout extraction model 224 may generate a child node from node 310. Node 310 may have a role attribute of heading, paragraph, or any other attribute that relates to text. The child node may have a role attribute of static text and a name attribute that is set to the text span.

Figure 1E:
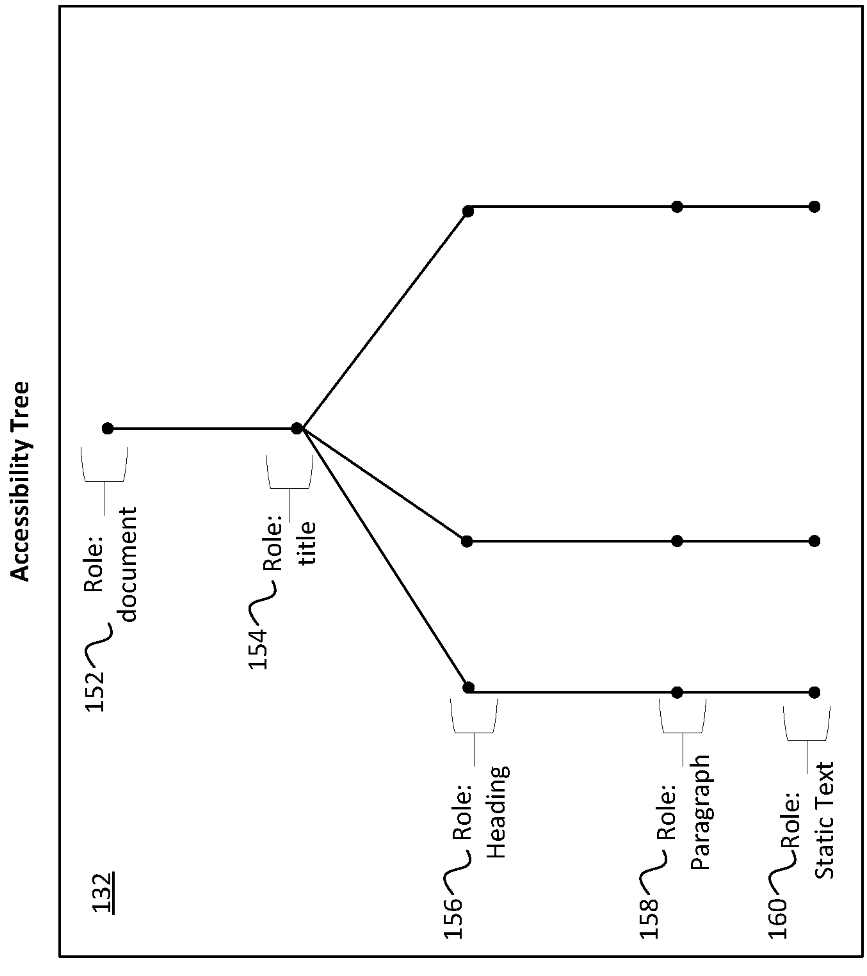
FIG. 1E depicts an accessibility tree, according to examples described in this disclosure.

FIG. 1E depicts an example accessibility tree 132, generated by accessibility infrastructure 212 based on displayable content 140. Accessibility tree 132 includes a root node 152 that has a role attribute of document. In examples, root node 152 may alternatively comprise a role attribute of image.

Root node 152 includes a child node 154. Child node 154 may include a text related role attribute. In examples, child node 154 may have a role attribute of a title or static text. In examples, child node 154 may have a name attribute of "A Guide to British Cheese Varieties."

Child node 154 includes three further child nodes 156. Child nodes 156 may each include a respective text related role attribute, for example heading or static text. In examples, child nodes 156 may include the name attributes of, "Stilton", "Cornish Yarg", and "Red Leicester".

Child nodes 156 may each include a respective child node 158. In examples, child nodes 158 may each include a respective text related role attribute, for example paragraph or static text. In examples, the name attributes of child nodes 158 may each include the content of the paragraphs found under their respective parent node heading in FIG. 1D.

In examples, child nodes 158 may each include a respective child node 160. In examples, child nodes 160 may each include a respective role attribute of static text and a respective name attribute including the content of the paragraphs under their respective parent node heading in FIG. 1D. In the case that child nodes 160 include name attributes with the content of the paragraphs in FIG. 1D, child nodes 158 may not include name attributes with the content of the paragraphs in FIG. 1D.

In examples, OCR model 226 may determine text-related role attributes for displayable content 140, such as, for example, a title, heading, or paragraph. In examples, layout extraction model 224 may determine text-related role attributes for displayable content 140 based on image 302. In examples, layout extraction model 224 may determine text-related role attributes for displayable content 140 based on the metadata found in the OCR text tree.

In examples, the order and/or arrangement of nodes in accessibility tree 132 may be determined based on at least one of: the order each node is encountered when traversing the OCR text tree, role attributes assigned to each node, and/or OCR model metadata associated with each node.

In examples, it may be determined that the role attribute comprises an icon-related attribute. An icon related attribute may include, for example, an envelope symbol for an email link, back arrow that means to navigate back to the previous website, a letter "i" for a link to information, etc. In response to determining that the portion of the image includes the icon-related attribute, layout extraction model 224 may execute icon model 228 on the portion of the image 302 to identify the role attribute associated with the icon-related attribute. For example, FIGS. 1A and 1B provide the example of an icon of an envelope that is a link to an email address.

In examples, layout extraction model 224 may determine that the role attribute comprises a button. In examples, layout extraction model 224 may identify a text within the portion of the image. The text may be used to set a name attribute 308.

In examples, layout extraction model 224 may determine that the attribute comprises a navigation bar, a toolbar, or any other control or widget.

In examples, layout extraction model 224 may call other models 230 to identify other elements in image 302 and add those elements to the list of elements.

In examples, the role attribute may be a first role attribute and the list of elements may further include a second role attribute. In examples, layout extraction model 224 may generate node 310. In examples the node may be a first node associated with the first role attribute, and the accessibility tree may further comprise a second node associated with the second role attribute.

In examples, layout extraction model 224 may not be able to determine a role attribute for an element. In examples where there is no role attribute for an element identified in image 302, layout extraction model 224 may not add that element to list of elements 306 or add that element to accessibility tree 312.

After layout extraction model 224 has executed, accessibility tree enhancement module 232 receives list of elements 306. In examples, accessibility tree enhancement module 232 may further receive any combination of name attribute 308 and/or node 310. Accessibility tree enhancement module 232 adds a role attribute to at least one node in accessibility tree 312. In examples, accessibility tree enhancement module 232 may also add, node 310 generated by layout extraction model 224 to accessibility tree 312.

In examples, accessibility tree enhancement module 232 may stitch node 310 into accessibility tree 312 based on the role attribute of node 310. In examples, the position where node 310 is stitched into accessibility tree 312 with respect to other nodes may be determined based on one or more attributes of the other nodes. In examples, the position where node 310 is stitched into accessibility tree 312 with respect to other nodes may be determined based on metadata associated with list of elements 306. In examples, the metadata may be received from OCR model 226 or layout extraction model 224. In examples, the metadata may indicate the position and/or dimensions of a bounding box 130 or text associated with an element. In examples, the metadata may comprise font and formatting information associated with an element, or any other clues operable to provide semantic and/or layout information relevant to the relationship between elements in image 302.

In examples, layout extraction model 224 may evaluate image 302 and generate a new accessibility tree 132 associated with image 302. The new accessibility tree 132 may then be stitched into a prior accessibility tree at the image node associated with image 302.

Figure 4A:
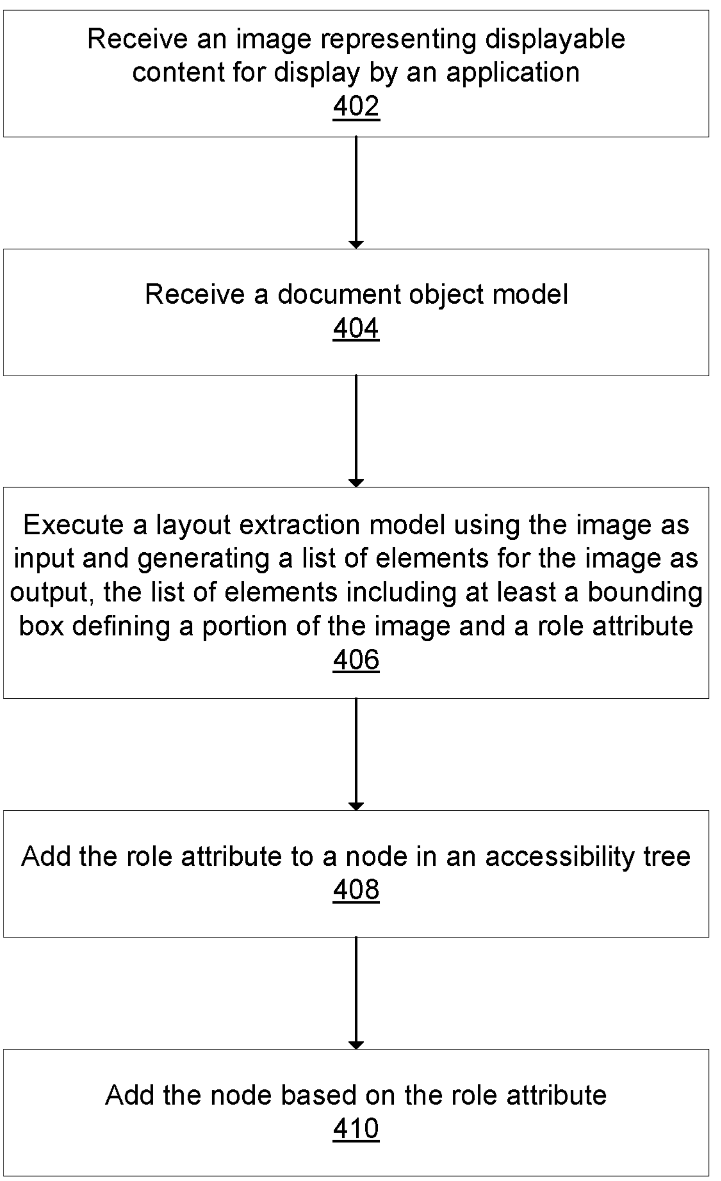
FIG. 4A depicts method 400A, according to examples described throughout this disclosure.

FIG. 4A depicts method 400A, in accordance with an example. Method 400A is operable to determine a list of elements for an image, the list of elements including a bounding box defining a portion of the image and role attribute. Method 400A is further operable to add the role attribute to a node in an accessibility tree.

Method 400A begins with step 402. In step 402 an image 302 representing displayable content 110 for display by an application 210 is received, as described above.

Method 400A continues with step 406. In step 406, layout extraction model 224 executes using image 302 as input, generating list of elements 306 including at least bounding box 130 defining a portion of image 302 and a role attribute, as described above.

Method 400A continues with step 408. In step 408, the role attribute is added to a node in accessibility tree 312, as described above.

In examples, method 400A may further comprise steps 404 and 410. In step 404, DOM 304 is received, as described above.

In step 410, node 310 is added to accessibility tree 312 based on role attribute, as described above.

Figure 4B:
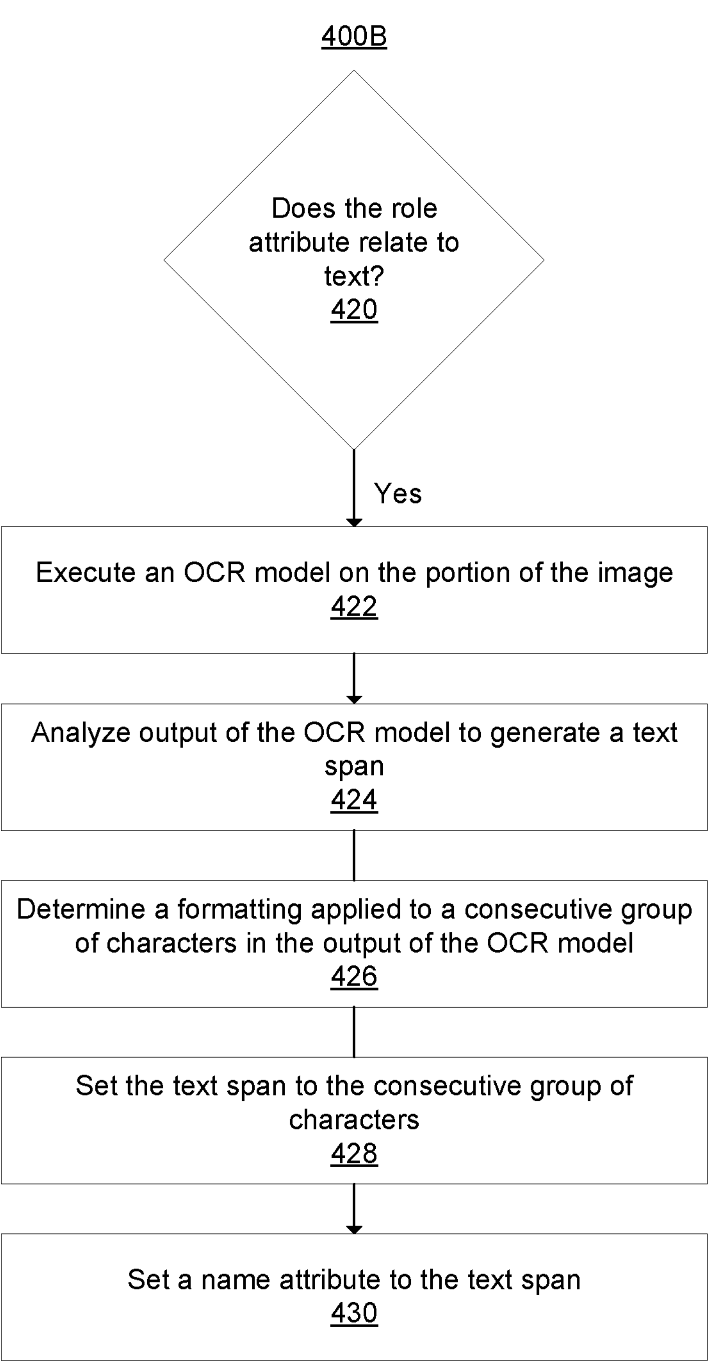
FIG. 4B depicts method 400B, according to examples described throughout this disclosure.
Figure 4C:
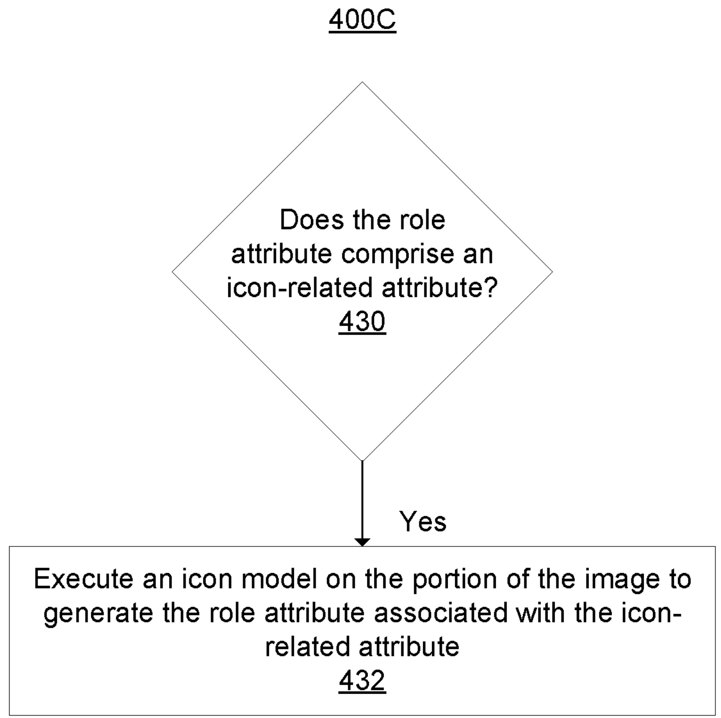
FIG. 4C depicts method 400C, according to examples described throughout this disclosure.
Figure 4D:
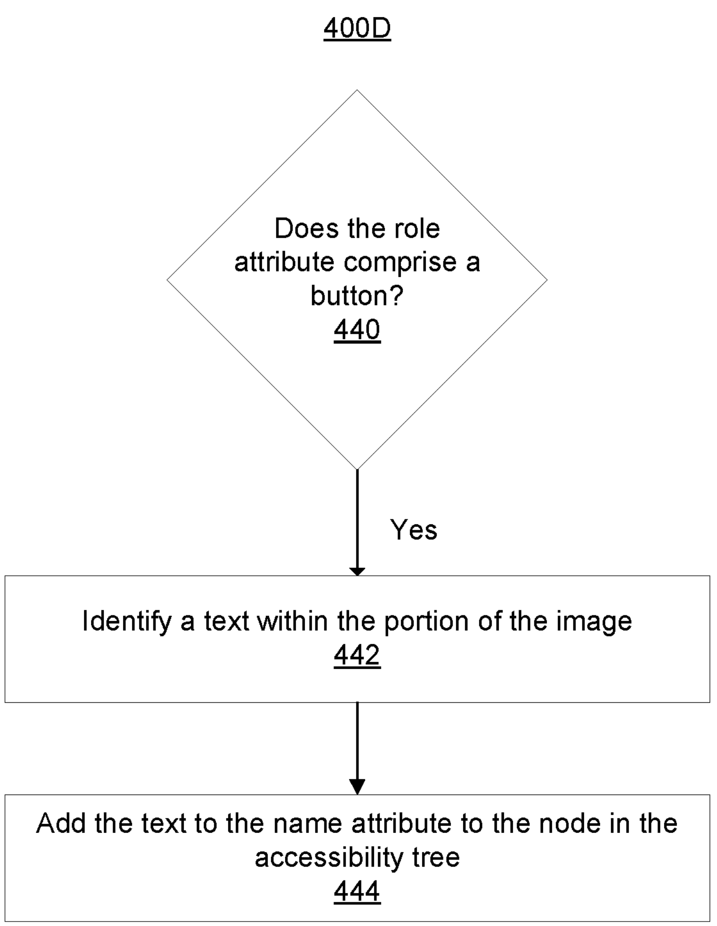
FIG. 4D depicts method 400D, according to examples described throughout this disclosure.

FIG. 4B depicts method 400B, FIG. 4C depicts method 400C, and FIG. 4D depicts method 400D. In examples, step 406 of method 400A may further comprise any of the steps of methods 400B, 400C, and 400D.

Method 400B begins with step 420. In step 420, is determined whether the role attribute relates to text, as described above.

If step 420 answers yes, step 422 is executed. In step 422, OCR model 226 is executed on the portion of image 302, as described above.

Method 400B may continue with step 424. In step 424 and output of the OCR model is analyzed to generate a text span, as described above.

Method 400B may continue with step 426. In step 426, the formatting applied to a consecutive group of characters in the output of the OCR model is determined, as described above.

Method 400B may continue with step 428. In step 428, the text span may be set to the consecutive group of characters, as described above.

Method 400B may continue with step 430. In step 430, the name attribute may be set to the text span, as described above.

Method 400C begins with step 430. In step 430 it is determine whether role attribute comprises an icon related attribute, as described above.

If step 430 answers yes, then step 432 is executed. In step 432, icon model 228 is executed on the portion of the image to generate the role attribute associated with the icon related attribute, as described above.

Method 400D begins with step 440. In step 440, it is determined whether the role attribute comprises a button, as described above.

If step 440 evaluates yes, then method 400D may continue with step 442. In step 442, a text may be identified within the portion of the image, as described above.

In examples, method 400D may continue with step 444. In step 444, the text may be added to the name attribute to node 310 and accessibility tree 312, as described above.

In examples, the methods described herein may comprise further steps. For example, after adding at least one of a role attribute or a node relating to an element to accessibility tree 312, accessibility infrastructure 212 may execute user commands that use accessibility tree 312, such as finding the element in a page, selecting an element, and copying an element. In examples, accessibility infrastructure 212 may use augmented accessibility tree 312 to perform any function that accessibility software typically performs.

The methods described herein may allow for displayable content to be included in an accessibility tree that was previously not available. The methods described are not dependent on any specific user application to execute. Especially when incorporated into a library accessible to user applications, the methods may allow for any accessibility software to provide improved access to displayable content over prior rules-based models.

Various examples of the systems and techniques described here can be realized in digital electronic circuitry, integrated circuitry, specially designed ASICs (application specific integrated circuits), computer hardware, firmware, software, and/or combinations thereof. These various examples can include example in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various examples of the systems and techniques described here can be realized as and/or generally be referred to herein as a circuit, a module, a block, or a system that can combine software and hardware aspects. For example, a module may include the functions/acts/computer program instructions executing on a processor or some other programmable data processing apparatus.

Some of the above examples are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing examples. Examples, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

The terminology used herein is for the purpose of describing particular implementations only and is not intended to be limiting of example implementations. As used herein, the singular forms a, an, and the are intended to include the plural forms as well, unless the context clearly indicates otherwise. It will be further understood that the terms includes, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative examples, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The examples are not limited by these aspects of any given examples.

Lastly, it should also be noted that whilst the accompanying claims set out particular combinations of features described herein, the scope of the present disclosure is not limited to the particular combinations hereafter claimed, but instead extends to encompass any combination of features or examples herein disclosed irrespective of whether or not that particular combination has been specifically enumerated in the accompanying claims at this time.

In some aspects, the techniques described herein relate to a method, further including: determining that the role attribute relates to text; and in response to determining that the portion of the image relates to text, executing an OCR model on the portion of the image and analyzing an output of the OCR model to generate a text span, and setting a name attribute to the text span.

In some aspects, the techniques described herein relate to a method, wherein analyzing the output of the OCR model to generate a text span includes determining a formatting applied to a consecutive group of characters in the output of the OCR model; and setting the text span to the consecutive group of characters.

In some aspects, the techniques described herein relate to a method, further including: determining that the role attribute includes an icon-related attribute; and in response to determining that the portion of the image includes the icon-related attribute, executing an icon model on the portion of the image to generate the role attribute associated with the icon-related attribute.

In some aspects, the techniques described herein relate to a method, further including: determining that the role attribute includes a button.

In some aspects, the techniques described herein relate to a method, further including: identifying a text within the portion of the image; and adding the text to a name attribute of the node in the accessibility tree.

In some aspects, the techniques described herein relate to a method, wherein the role attribute is a first role attribute and the list of elements further includes a second role attribute.

In some aspects, the techniques described herein relate to a method, further including: adding the node based on the role attribute.

In some aspects, the techniques described herein relate to a method, wherein the image is received in response to determining that the accessibility tree for the displayable content displayed by the application has an image node or a document node missing an attribute.

In some aspects, the techniques described herein relate to a method, wherein the image includes an image-based portable document format document.

In some aspects, the techniques described herein relate to a method, wherein the image is received in response to a user command.

In some aspects, the techniques described herein relate to a method, further including: receiving a document object model, and wherein executing the layout extraction model further includes using the document object model as input.

In some aspects, the techniques described herein relate to a method, wherein the method executes on a browser extension or a browser plugin.

In some aspects, the techniques described herein relate to a system, wherein the layout extraction model is further configured to determine that the role attribute relates to text, and in response to determining that the portion of the image relates to text, execute an OCR model on the portion of the image and analyze an output of the OCR model to generate a text span, and setting a name attribute to the text span.

In some aspects, the techniques described herein relate to a system, wherein the layout extraction model is further configured to determine a formatting applied to a consecutive group of characters in the output of the OCR model and set the text span to the consecutive group of characters.

In some aspects, the techniques described herein relate to a system, wherein the layout extraction model is further configured to determine that the role attribute includes an icon-related attribute, in response to determining that the portion of the image includes the icon-related attribute, execute an icon model on the portion of the image to generate the role attribute associated with the icon-related attribute.

In some aspects, the techniques described herein relate to a system, wherein the layout extraction model is further configured to determine that the role attribute includes a button.

In some aspects, the techniques described herein relate to a system is, wherein the layout extraction model is further configured to identify a text within the portion of the image, and add the text to a name attribute of the node in the accessibility tree.

In some aspects, the techniques described herein relate to a system is, wherein the role attribute is a first role attribute and the list of elements further includes a second role attribute.

In some aspects, the techniques described herein relate to a system, wherein the accessibility tree augmentation module is further configured to add the node based on the role attribute.

In some aspects, the techniques described herein relate to a system, wherein the image is received in response to determining that the accessibility tree for the displayable content displayed by the application has an image node or a document node missing an attribute.

In some aspects, the techniques described herein relate to a system, wherein the image includes an image-based portable document format document.

In some aspects, the techniques described herein relate to a system, wherein the image is received in response to a user command.

In some aspects, the techniques described herein relate to a system, wherein system further includes a document object model receiving module and the layout extraction model further uses a document object model to determine the list of elements.

In some aspects, the techniques described herein relate to a system, wherein the layout extraction model executes on a browser extension or a browser plugin.

In some aspects, the techniques described herein relate to a computing device, wherein the memory is further configured with instructions to: determine that the role attribute relates to text, and in response to determining that the portion of the image relates to text, execute an OCR model on the portion of the image and analyzing an output of the OCR model to generate a text span, and set a name attribute to the text span.

In some aspects, the techniques described herein relate to a computing device, wherein analyzing the output of the OCR model to generate a text span includes determining a formatting applied to a consecutive group of characters in the output of the OCR model and the memory is further configured with instructions to: set the text span to the consecutive group of characters.

In some aspects, the techniques described herein relate to a computing device, wherein the memory is further configured with instructions to: determine that the role attribute includes an icon-related attribute, and in response to determining that the portion of the image includes the icon-related attribute, execute an icon model on the portion of the image to generate the role attribute associated with the icon-related attribute.

In some aspects, the techniques described herein relate to a computing device, wherein the memory is further configured with instructions to: determine that the role attribute includes a button.

In some aspects, the techniques described herein relate to a computing device, wherein the memory is further configured with instructions to: identify a text within the portion of the image; and add the text to a name attribute to the node in the accessibility tree.

In some aspects, the techniques described herein relate to a computing device, wherein the role attribute is a first role attribute and the list of elements further includes a second role attribute.

In some aspects, the techniques described herein relate to a computing device, wherein the memory is further configured with instructions to: add the node based on the role attribute.

In some aspects, the techniques described herein relate to a computing device, wherein the image is received in response to determining that the accessibility tree for the displayable content displayed by the application has an image node or a document node missing an attribute.

In some aspects, the techniques described herein relate to a computing device, wherein the image includes an image-based portable document format document.

In some aspects, the techniques described herein relate to a computing device, wherein the image is received in response to a user command.

In some aspects, the techniques described herein relate to a computing device, wherein the memory is further configured with instructions to: receive a document object model, and wherein executing the layout extraction model further includes using the document object model as input.

In some aspects, the techniques described herein relate to a computing device, wherein the instructions execute in a browser extension or a browser plugin.

What is claimed is:

1. A method comprising:

receiving an image representing displayable content rendered by an application, the displayable content being associated with an accessibility tree;

determining, via a layout extraction model using the image as input, a component visually depicted in the image and lacking a corresponding representation in the accessibility tree;

in response to determining the component, generating a representation of the component, the representation including an attribute defining a role for the component within the accessibility tree;

determining that the role relates to text;

in response to determining that the role relates to text:

executing an optical character recognition model on the component, generating a text span by determining a formatting applied to a consecutive group of characters in an output of the optical character recognition model and setting a value of the text span to the consecutive group of characters based on the formatting, and setting a name attribute of the representation to the value of the text span; and modifying the accessibility tree by inserting the representation into the accessibility tree at a position determined based on spatial coordinates associated with the component.

2. The method as claimed in claim 1, further comprising: determining that the component is associated with an icon-related attribute; and in response to determining that the component is associated with the icon-related attribute, identifying the role by executing an icon model on the component and setting the attribute of the representation to the role.

3. The method as claimed in claim 1, further comprising: determining that the role includes a button; and in response to determining that the role includes a button: identifying text visually depicted within the component, and adding the text to a name attribute of the representation.

4. The method as claimed in claim 1, wherein the image is received in response to determining that the accessibility tree for the displayable content has a node missing an attribute or possessing a null attribute value.

5. The method as claimed in claim 1, wherein analyzing the output of the optical character recognition model includes traversing an optical character recognition text tree having a hierarchy of nodes representing the component.

6. The method as claimed in claim 1, wherein the accessibility tree is a first accessibility tree, and modifying the first accessibility tree includes generating a second accessibility tree by inserting the representation into the first accessibility tree at the position determined based on the spatial coordinates associated with the component, and replacing the first accessibility tree with the second accessibility tree.

7. The method as claimed in claim 1, wherein the role defines a functional classification of the component as a specific user interface element and is identified via the visual depiction of the component within the image.

8. The method as claimed in claim 1, wherein the representation includes a node, the node including a name attribute or a description attribute corresponding to the component.

9. The method as claimed in claim 1, wherein the spatial coordinates define a location and dimensions of the component within the image.

10. The method as claimed in claim 9, wherein the spatial coordinates include a bounding box.

11. The method as claimed in claim 1, further comprising: determining, via the layout extraction model, the role of the component based on a visual appearance of the component within the image.

12. The method as claimed in claim 1, further comprising: determining, via the layout extraction model, the spatial coordinates by identifying a location of the component within the image.

13. The method as claimed in claim 1, wherein determining the component includes identifying a disparity between the displayable content and the accessibility tree by comparing metadata nodes present in the accessibility tree with pixel data of the image.

14. The method as claimed in claim 1, further comprising: providing the modified accessibility tree to an assistive technology to enable programmatic navigation of the component via the representation.

15. A computing device comprising:

a processor; and a memory storing instructions that, when executed by the processor, cause the computing device to perform operations comprising:

receiving an image representing displayable content rendered by an application, the displayable content being associated with an accessibility tree, determining, via a layout extraction model using the image as input, a component visually depicted in the image and lacking a corresponding representation in the accessibility tree, in response to determining the component, generating a representation of the component, the representation including an attribute defining a role for the component within the accessibility tree, determining, via the layout extraction model, that the role relates to text; and in response to determining that the role relates to text:

executing an optical character recognition model on the component, generating, via the layout extraction model, a text span by determining a formatting applied to a consecutive group of characters in an output of the optical character recognition model and setting a value of the text span to the consecutive group of characters based on the formatting, and setting a name attribute of the representation to the value of the text span, and modifying the accessibility tree by inserting the representation into the accessibility tree at a position determined based on spatial coordinates associated with the component.

16. The computing device as claimed in claim 15, wherein the operations further comprise:

determining, via the layout extraction model, that the role includes a button, and in response to determining that the role includes a button:

identifying, via the layout extraction model, text visually depicted within the component, and adding, via the layout extraction model, the text to a name attribute of the representation in the accessibility tree.

* * * * *